(12) United States Patent
Jeong et al.

(10) Patent No.: US 10,718,973 B2
(45) Date of Patent: Jul. 21, 2020

(54) DISPLAY DEVICE

(71) Applicant: SAMSUNG ELECTRONICS CO., LTD., Suwon-si (KR)

(72) Inventors: Seung Jun Jeong, Suwon-si (KR); Joo Won Lee, Suwon-si (KR); Min Woo Kang, Suwon-si (KR); Sei Young Kang, Suwon-si (KR); Dong Jun Lee, Suwon-si (KR); Jae Jeong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/425,220

(22) Filed: May 29, 2019

(65) Prior Publication Data

US 2020/0041842 A1 Feb. 6, 2020

(30) Foreign Application Priority Data

Aug. 2, 2018 (KR) .................. 10-2018-0090468

(51) Int. Cl.
*G02F 1/13357* (2006.01)

(52) U.S. Cl.
CPC .. *G02F 1/133606* (2013.01); *G02F 1/133603* (2013.01); *G02F 1/133605* (2013.01); *G02F 2001/133607* (2013.01)

(58) Field of Classification Search
CPC ......... G02F 1/133606; G02F 1/133603; G02F 1/133605; G02F 2001/133607
See application file for complete search history.

(56) References Cited

U.S. PATENT DOCUMENTS

| 2005/0001952 A1 | 1/2005 | Han et al. |
| 2007/0133094 A1 | 6/2007 | Walton et al. |
| 2008/0055929 A1 | 3/2008 | Kuroda et al. |

(Continued)

FOREIGN PATENT DOCUMENTS

| JP | 2005-221619 A | 8/2005 |
| KR | 10-2010-0051009 A | 5/2010 |

OTHER PUBLICATIONS

International Search Report (PCT/ISA/210) dated Nov. 18, 2019 issued by the International Searching Authority in International Application No. PCT/KR2019/009641.

(Continued)

*Primary Examiner* — Mary Ellen Bowman
(74) *Attorney, Agent, or Firm* — Sughrue Mion, PLLC

(57) ABSTRACT

A display device includes a display panel for displaying an image, a light source module including a plurality of light sources, and an optical sheet provided between the display panel and the light source module for guiding light radiated by the light source module to the display panel. The optical sheet includes a first transparent layer including a plurality of grooves provided on a first surface of the optical sheet that is opposite to the display panel, and having a first refraction index, a second transparent layer provided in each of the plurality of grooves and having a second refraction index that is different from the first refraction index, and a reflective layer including a light reflective material provided in each of the plurality of grooves and covering the second transparent layer, and including a light-reflective material.

20 Claims, 13 Drawing Sheets

(56) References Cited

U.S. PATENT DOCUMENTS

2011/0235362 A1  9/2011  Liu
2012/0075547 A1* 3/2012  Aoyama ............. G02B 5/0247
                                                         349/56
2016/0238863 A1* 8/2016  Kashiwagi ........... G02B 6/0053

OTHER PUBLICATIONS

Communication dated Jan. 3, 2020, issued by the European Patent Office in counterpart European Application No. 19188187.9.

* cited by examiner

DISPLAY DEVICE

CROSS-REFERENCE TO RELATED APPLICATION

This application is based on and claims priority under 35 U.S.C. § 119 to Korean Patent Application No. 10-2018-0090468, filed on Aug. 2, 2018, in the Korean Intellectual Property Office, the disclosure of which is incorporated by reference herein in its entirety.

BACKGROUND

1. Field

The disclosure relates to a display device, and more particularly, to a display device including an enhanced optical sheet.

2. Description of Related Art

Display devices are apparatuses for displaying an image on a screen, such as monitors, televisions, etc. A display device may include an actively light-emitting display panel such as organic light emitting diodes (OLEDs) and a passively light-emitting display panel such as liquid crystal displays (LCDs).

A display device employing the passively light-emitting display panel includes a display panel formed with a liquid crystal panel to display in image on a screen, and a backlight unit for supplying light to the display panel, and the backlight unit includes a light source module having a light source, and a plurality of optical sheets for receiving light from the light source and guiding the light to the display panel.

SUMMARY

Provided is a display device with an enhanced optical sheet to minimize loss of light.

Further, provided is a display device with an enhanced optical sheet to increase color reproducibility.

In accordance with an aspect of the disclosure, a display device includes a display panel configured to display an image; a light source module including a plurality of light sources; and an optical sheet provided between the display panel and the light source module, the optical sheet being configured to guide light radiated by the light source module to the display panel, wherein the optical sheet includes a first transparent layer including a plurality of grooves provided on a first surface of the optical sheet opposite to a second surface of the optical sheet facing the display panel, the first transparent layer having a first refraction index, a second transparent layer provided in each groove of the plurality of grooves, the second transparent layer having a second refraction index that is different from the first refraction index, and a reflective layer arranged in each groove of the plurality of grooves and covering the second transparent layer, the reflective layer including a light-reflective material.

The first refraction index may be greater than the second refraction index.

The first surface may further include a plurality of transmission portions provided between the plurality of grooves, the plurality of transmission portions being configured to transmit incident light exiting the light source module.

The first surface of the first transparent layer may be configured to prevent light from being refracted while passing through the second surface of the first transparent layer.

The plurality of grooves may include a first groove including a first incline and a second incline, the plurality of transmission portions may include a first transmission portion adjacent to the first incline, and light transmitted by the first transmission portion and incident upon the first incline may be totally reflected by the first incline.

The optical sheet may be configured such that light totally reflected by the first incline is incident upon the second surface at a right angle to the second surface.

The second transparent layer may contact 90% or more of surfaces of the first and second inclines.

The reflective layer may contact the second transparent layer such that the second transparent layer is not exposed on an external surface of the optical sheet.

The first surface may include surfaces of the plurality of transmission portions.

A distance between the first and second inclines is greater at the first surface than at a location away from the first surface.

Each of the first and second inclines may have a rectangular form.

Each of the first and second inclines may have a form of a curved plane.

The plurality of grooves may include a second groove, the second groove having a size that is different from a size of the first groove.

The second groove may have a shape that is different from a shape of the first groove.

The display device may further include a diffusion sheet provided between the light source module and the optical sheet, the diffusion sheet being configured to diffuse light exiting the light source module.

In accordance with an aspect of the disclosure, a display device includes a display panel configured to display an image in a first direction; a light source module including a plurality of light sources; a diffusion sheet configured to diffuse light radiated by the light source module in the first direction; and an optical sheet provided between the display panel and the diffusion sheet, the optical sheet being configured to guide light diffused by the diffusion sheet to the display panel, wherein the optical sheet includes a first transparent layer including a plurality of grooves provided on a first surface of the optical sheet opposite to a second surface of the optical sheet facing the diffusion sheet, a second transparent layer provided in each groove of g the plurality of grooves, and a reflective layer provided in each groove of the plurality of grooves and covering the second transparent layer, the reflective layer including a light-reflective material.

A first refraction index of the first transparent layer may be higher than a second refraction index of the second transparent layer.

The first surface may further include a plurality of transmission portions provided between the plurality of grooves, the plurality of transmission portions being configured to transmit incident light exiting the diffusion sheet.

The plurality of grooves may include a first groove including a first incline and a second incline, the plurality of transmission portions may include a first transmission portion adjacent to the first incline, and light transmitted by the first transmission portion and incident upon the first incline may be totally reflected by the first incline.

In accordance with an aspect of the disclosure, a display device includes a display panel configured to display an image; a light source module including a plurality of light sources; a diffusion sheet configured to diffuse light radiated by the light source module and traveling to the display panel; and an optical sheet provided between the display panel and the diffusion sheet, wherein the optical sheet includes a first transparent layer having a first refraction index and a second transparent layer having a second refraction index that is different from the first refraction index, and light entering the optical sheet through the first transparent layer is totally reflected at a border between the first and second transparent layers and is transmitted by the optical sheet.

BRIEF DESCRIPTION OF THE DRAWINGS

The above and other objects, features and advantages of certain embodiments of the present disclosure will be more apparent from the following description taken in conjunction with the accompanying drawings, in which.

DETAILED DESCRIPTION

Figure 1:
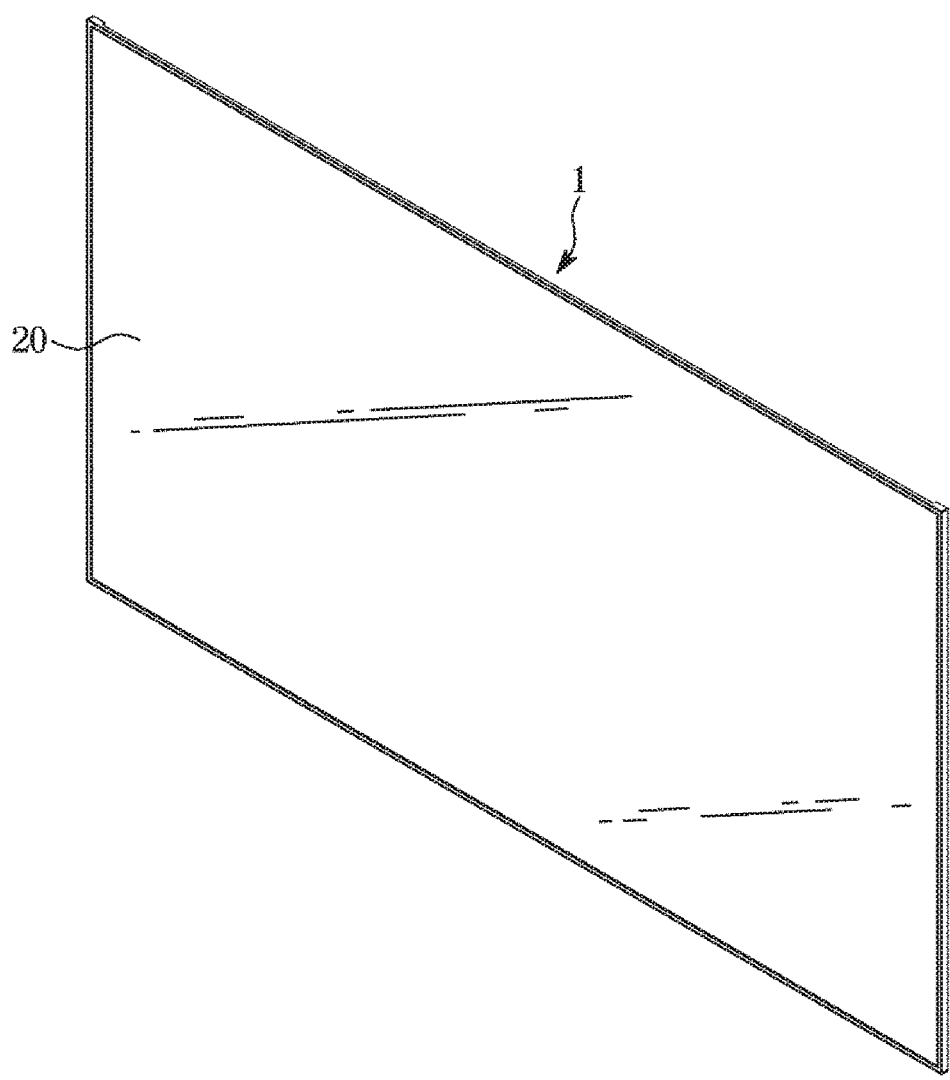
FIG. 1 is a perspective view of a display device, according to an embodiment.

Embodiments and features as described and illustrated in the present disclosure are examples, and various modifications thereof may also fall within the scope of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or chamber discussed below could be termed a second element, component, region, layer or section without departing from the teachings of the present disclosure. Descriptions shall be understood as to include any and all combinations of one or more of the associated listed items when the items are described by using the conjunctive term "~ and/or ~," or the like.

Reference will now be made in detail to embodiments, examples of which are illustrated in the accompanying drawings.

Figure 2:
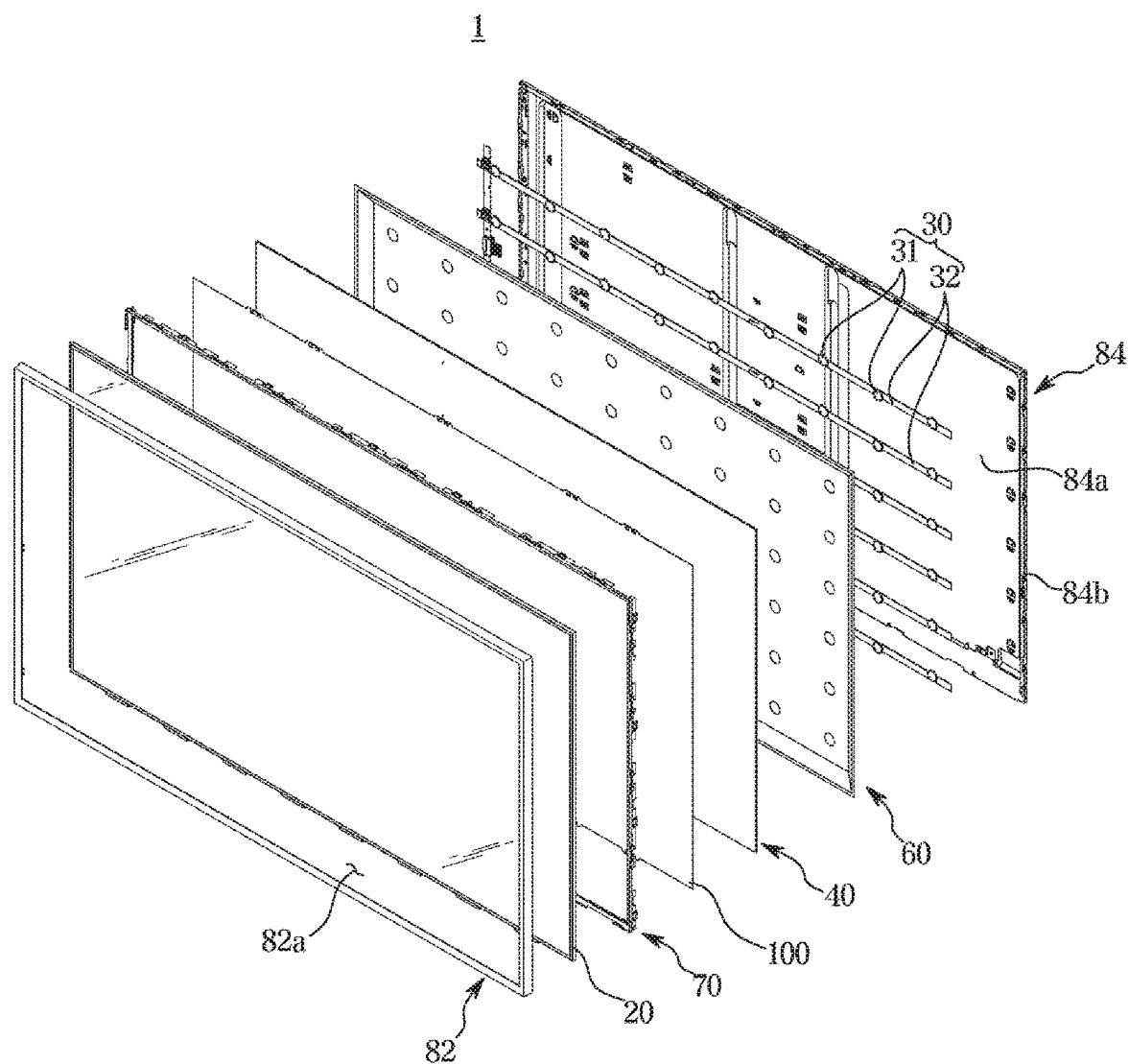
FIG. 2 is an exploded perspective view of a display device, according to an embodiment.
Figure 3:
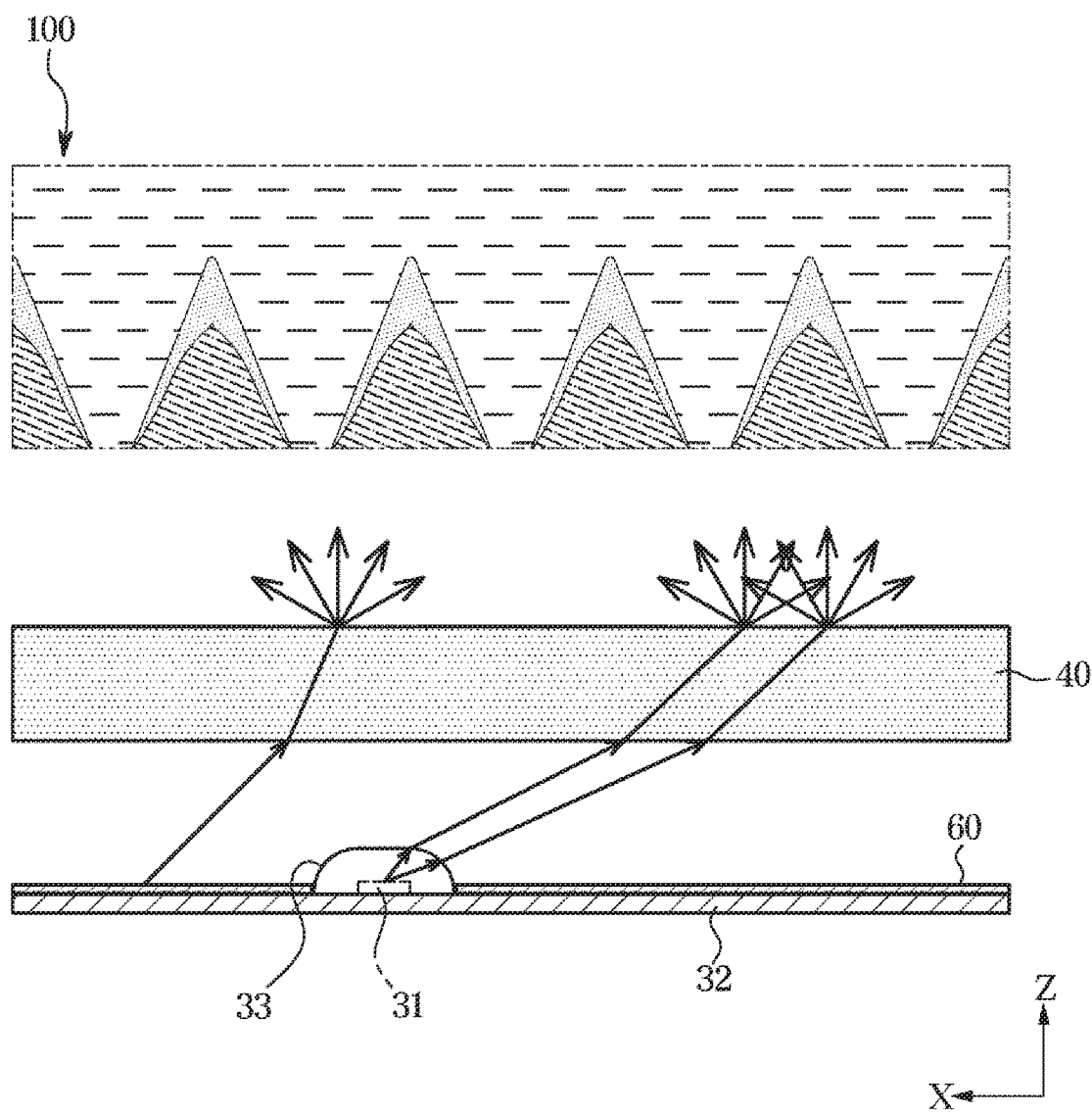
FIG. 3 is a cross-sectional view of part of a display device, according to an embodiment.

FIG. 1 is a perspective view of a display device, according to an embodiment, FIG. 2 is an exploded perspective view of a display device according to an embodiment, and FIG. 3 is a cross-sectional view of part of a display device according to an embodiment.

While the following description will focus on a flat display device 1, embodiments may be applied to bendable display devices as well.

The terms 'forward' and 'front' are defined with respect to a display panel 20 of the display device 1 shown in FIG. 1, i.e., the front side of the display panel 20 on which an image is displayed. The terms 'top (or upper side)' and 'bottom (or lower side)' indicate top and bottom of the display device 1 shown in FIG. 1, respectively, and 'both sides' and 'sideways (or laterally)' refer to the horizontal direction of the display device 1.

The display device 1 may include a display module for displaying an image.

The display device 1 may include a chassis assembly that accommodates and supports the display panel 20 and a backlight unit.

The display panel 20 may include a liquid crystal panel formed of liquid crystals enclosed between two glass panels each having an electrode. The display panel 20 may be configured to display an image on the front side of the display panel 20.

The chassis assembly may include a front chassis 82, a middle mold 70, and a rear chassis 84.

The front chassis 82 may include an opening 82a to expose the display panel 20. The rear chassis 84 may include a rear part 84a arranged behind the backlight unit, and a rear side part 84b extending forward from the rear part 84a.

Many different components of the display device 1, such as the front chassis 82 and the middle mold 70 may be supported on the rear chassis 84.

The rear chassis 84 may serve to radiate heat generated from a light source 31 to the outside. Specifically, the heat generated from the light source 31 may be conveyed to the rear chassis 84 through a printed circuit board (PCB) 32, and radiated from the rear chassis 84. For this, the rear chassis 84 may be formed of aluminum, various metals such as stainless steel (SUS), or plastics such as acrylonitrile butadiene styrene (ABS), which have good heat conductivity. Also for the PCB 32, a metal such as aluminum with good heat conductivity may be used.

In another embodiment, however, at least one of the front chassis 82, the middle mold 70, and the rear chassis 84 may be omitted or integrated with another.

The display device 1 may further include a housing for covering the chassis assembly to protect and accommodate the chassis assembly, or a rear cover for covering the rear side of the rear chassis 84.

The display device 1 may further include a backlight unit provided to supply light to the display panel 20.

In the embodiment, the backlight unit may be of a direct type in which the light source 31 is arranged right behind the display panel 20. The backlight unit may include a light source module 30 that includes the light source 31 and the PCB 32 with the light source mounted thereon, and various optical sheets 100 arranged in a traveling path of light radiated from the light source 31.

The light source 31 may be provided to supply light to the display panel 20. The light source 31 may include light emitting diodes (LEDs). The LEDs may be provided in a package in which an LED chip is mounted on a substrate and which is filled with resins. In another embodiment, a cold cathode fluorescent lamp (CCFL) or an external electrode fluorescent lamp (EEFL) may be used for the light source.

A plurality of light sources 31 may be mounted on the PCB 32 at certain intervals. For example, a circuit pattern to convey driving power and signals to the light sources 31 may be formed on the PCB 32. The PCB 32 may be safely arranged on the rear chassis 84.

Light output by the light source 31 may be directly supplied to the display panel 20 unlike in an edge type display device.

In this regard, to improve optical characteristics of light output from the light source 31, the optical sheet 100 may be arranged between the light source 31 and the display panel 20.

The backlight unit may include a diffusion sheet 40. The diffusion sheet 40 may block or minimize light radiated from the light source 31. When the diffusion sheet is not present, the light radiated from (i.e., exiting) the light source 31 travels directly into a viewer's eyes, making the pattern in which the light source 31 is arranged visible. Thus, the diffusion sheet is used to cancel or minimize this effect.

Typically, the diffusion sheet 40 is included in the optical sheet 100 as a part of the optical sheet 100. The diffusion sheet 40 may be provided to diffuse the light radiated from the light source module 30 in all directions such that light exiting the diffusion sheet 40 is uniformly cast in all directions.

It is, however, assumed that the optical sheet 100 and the diffusion sheet 40 are separate components for explaining the optical sheet 100 according to an embodiment.

In this case, the optical sheet 100 may be arranged between the display panel 20 and the diffusion sheet 40. It is not, however, limited thereto, but the display device 1 may not include the diffusion sheet 40 in some embodiments.

The backlight unit may further include a reflector sheet 60 for reflecting light to prevent loss of light. As shown in FIG. 3, for example, the reflector sheet 60 may reflect light radiated from the light source 31 to be incident on the diffusion sheet 40. The reflector sheet 60 may have various forms, such as a sheet, a film, a plate, etc. For example, the reflector sheet 60 may be formed by coating a base material with a highly reflective material. SUS, brass, aluminum, polyethylene terephthalate (PET), etc., may be used for the base material, and silver, $TiO_2$, etc., may be used as a highly reflective coating agent. The reflector sheet 60 may be safely seated and supported on the PCB 32.

The light source module 30 may include an obtuse-angled lens 33 provided to cover the light source 31 such that the light output from the light source 31 is incident on the diffusion sheet 40 at a certain angle with the diffusion sheet 40 in a front to back direction of the display panel 20. The light radiated from the light source 31 may be incident on the overall area of the diffusion sheet 40 at various incidence angles through the obtuse-angled lens 33.

Specifically, the light radiated from the light source 31 may be refracted through the obtuse-angled lens 33 and may be incident upon an entire surface of the diffusion sheet 40, and the light that passes through the diffusion sheet 40 may be output from the output plane to all directions and may be incident upon the optical sheet 100.

The optical sheet 100 according to an embodiment will now be described in detail.

Figure 4:
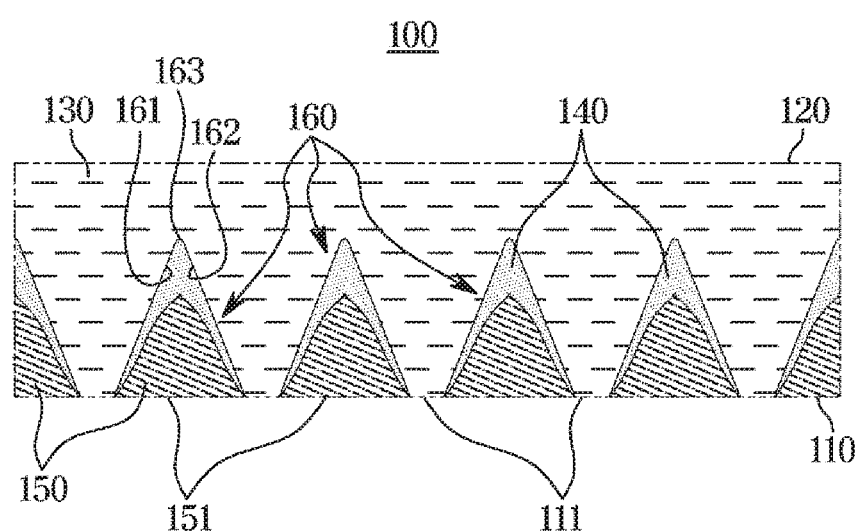
FIG. 4 is a cross-sectional view of an optical sheet, according to an embodiment.
Figure 5:
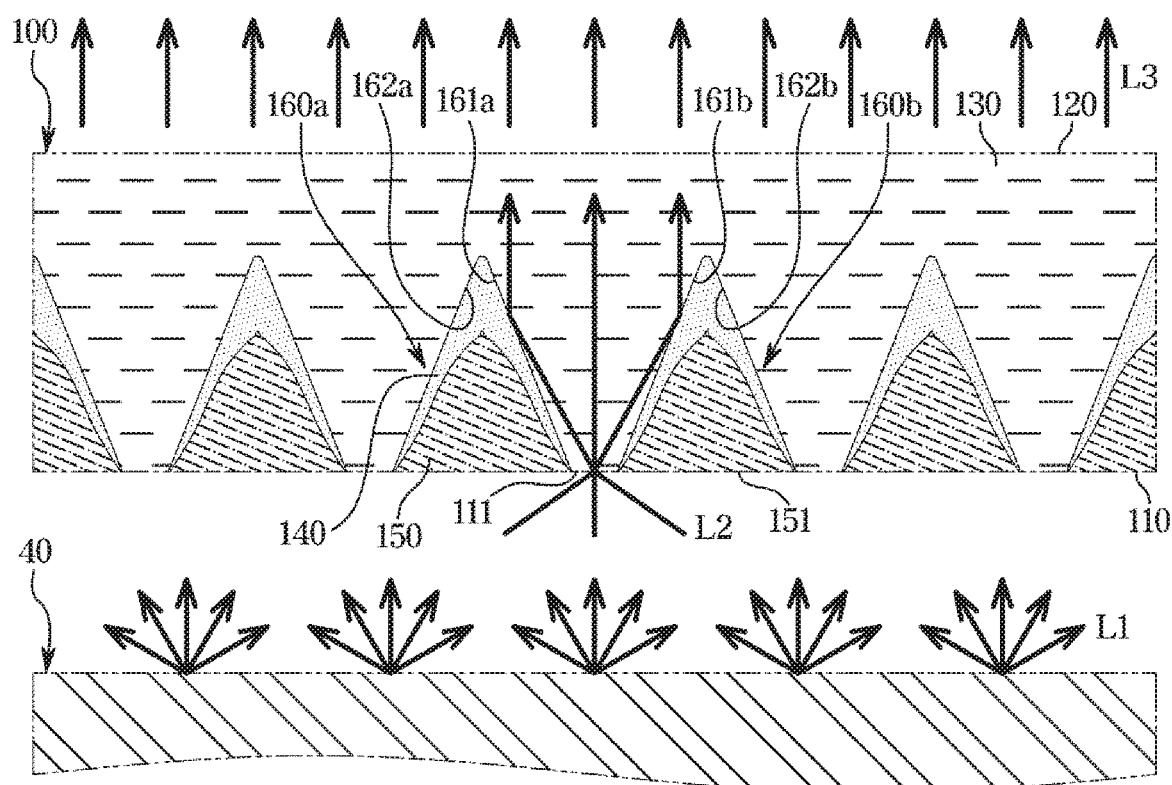
FIG. 5 schematically shows a state in which an optical sheet of a display device transmits light, according to an embodiment.
Figure 6:
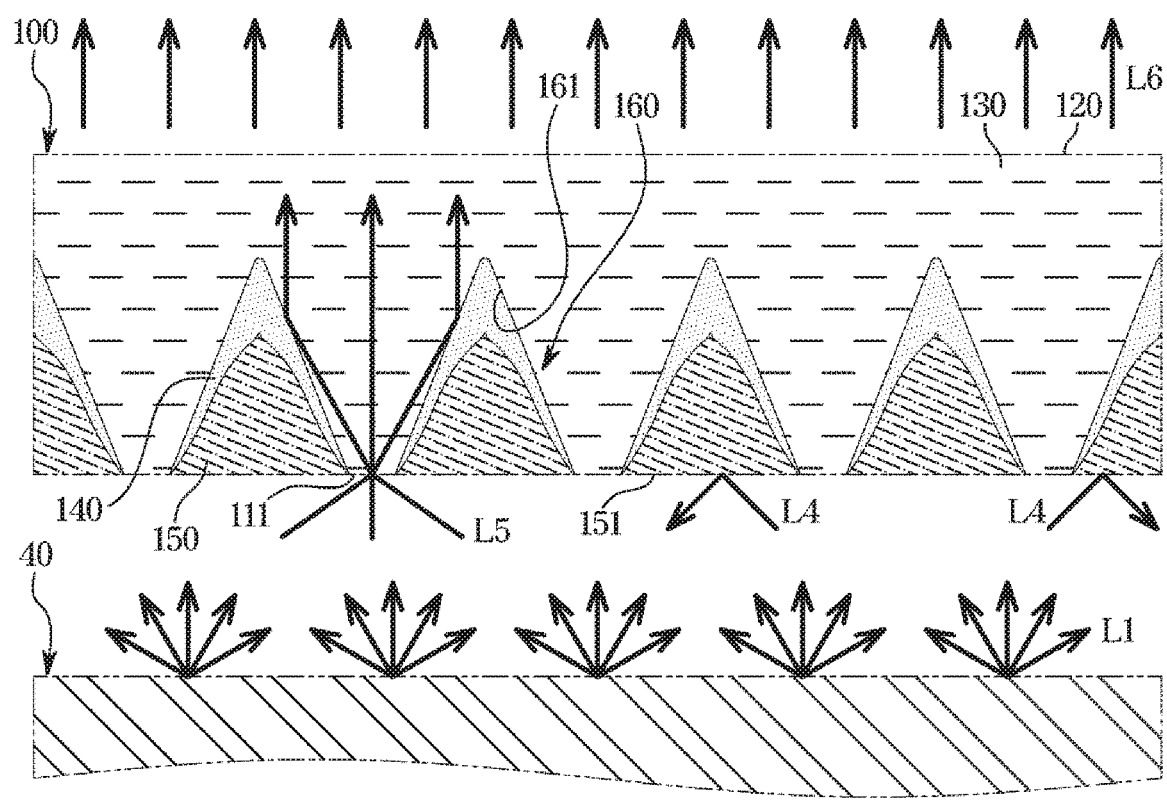
FIG. 6 schematically shows a state in which an optical sheet of a display device transmits light, according to an embodiment.
Figure 7:
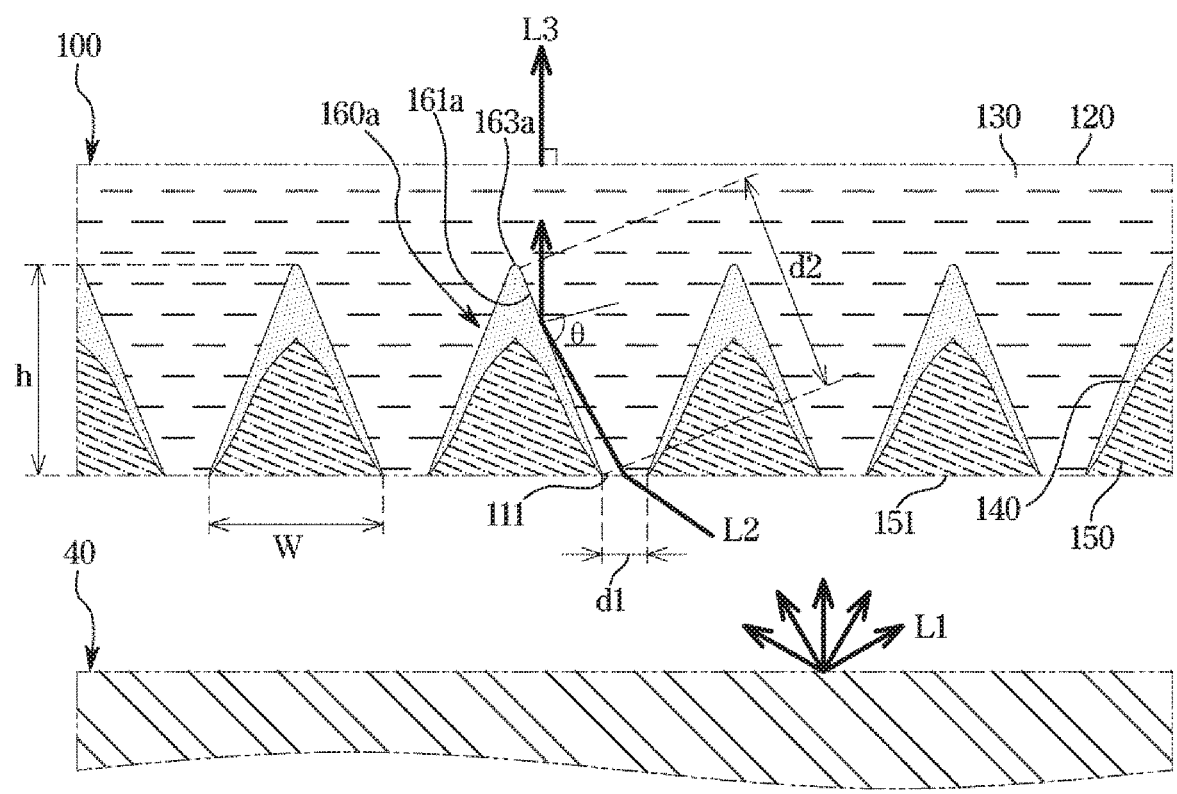
FIG. 7 schematically shows a state in which an optical sheet of a display device transmits light, according to an embodiment.

FIG. 4 is a cross-sectional view of an optical sheet according to an embodiment. FIGS. 5, 6, and 7 schematically show states in which an optical sheet of a display device transmits light according to embodiments.

An optical sheet may include a prism sheet and a protective sheet in addition to the diffusion sheet (on the assumption that the diffusion sheet is a separate component from the optical sheet, as described above).

Since the light output from the light source module is output through a pattern formed on the front of a light guide panel, thus making visible the pattern formed on the front of the light guide panel, the diffusion sheet is used to prevent the pattern from being visible by diffusing the light output from the light guide panel to keep the luminosity of the entire face uniform.

The prism sheet includes a prism pattern in a triangular prism shape, and a plurality of such prism patterns are closely arranged to make the shape of a plurality of strips. The prism patterns are formed to protrude toward the display panel in ridged rows. The light diffused from the diffusion sheet is refracted while passing through the prism patterns, and hence, may enter into the display panel at a right angle to the surface of the display panel.

The protective sheet is a component to protect many different parts from external shock or inflow of foreign materials, and especially protect the prism sheet that is easily scratched from being scratched.

In the case of the optical sheet 100 according to an embodiment, the optical sheet 100 may additionally include the protective sheet and other sheets having other optical characteristics.

When a prism sheet including the aforementioned prism pattern is used, some light fails to reach the display panel but is instead refracted in the other direction, causing a loss of light. Specifically, when the light is directed laterally to the display panel from the prism sheet, an image displayed on the display device is formed inefficiently due to the strong lateral light (because the user mainly looks at the display device from a position in the front of the display device instead of to the side). Further, light is directed to the outside of the display panel and absorbed by another component, causing a loss of light.

Furthermore, as more light is incident on the display panel at a slanted angle, color reproducibility and luminosity of the display panel may degrade. Thus, when the amount of light that is refracted through the prism sheet and incident slantingly on the display panel increases, the performance of the display device degrades.

Especially, in the case of a direct type display, light is radiated directly from behind the display panel 20, so the light may sometimes be radiated around the edges of the display panel instead of from the front of the display panel.

The direct type display device may be able to do fine local dimming and thus easily control brightness of a minute image, but may have a loss in light intensity as the amount of light radiated laterally to the display panel increases.

To prevent this, a prism panel is configured such that a component to absorb the light traveling in the lateral direction of the display panel or around the edges of the display panel is integrated into the prism sheet, or such that an elaborate prism arrangement enables the light that passes through the prism to be output to the display device at a right angle.

Especially, more of the light output from the light source is focused by the prism sheet away from the lateral direction toward the front of the display panel, enabling the direct type display device to easily do local dimming while having improved light intensity of the display panel.

In other words, with the prism sheet, among rays output to the display panel, some rays entering slantingly or laterally to the display panel or entering to the side or around edges of the display panel are absorbed or focused onto the center of the display panel through elaborate refraction.

However, this may cause a problem of low light efficiency of the display device due to the absorbed light, and a bigger problem with manufacturing efficiency of the prism sheet because the elaborate prism arrangement is more difficult to manufacture.

To solve the aforementioned problems, the optical sheet 100 of the display device 1 according to an embodiment is provided to totally reflect all the rays that pass through the optical sheet 100, thereby preventing a loss of luminosity, and the optical sheet 100 may be formed in a simple configuration, thereby improving manufacturing efficiency.

Specifically, as shown in FIG. 4, the optical sheet 100 may include a first transparent layer 130 (i.e., a first transparent material) that includes a plurality of grooves 160 formed on a first surface 110 facing the diffusion sheet 40, a second transparent layer 140 (i.e., a second transparent material) arranged inside the plurality of grooves 160, and a reflective layer 150 (i.e., a reflective material) arranged inside the plurality of grooves 160 to cover the second transparent layer 140 from the outside from the first surface 110. In other words, the reflective layer 150 may be arranged such that a rear surface of the second transparent layer 140 contacts the reflective layer 150 as shown in FIG. 4.

The first transparent layer 130 may form the body of the optical sheet 100 and have a first refractive index. The first surface 110 is a plane facing the diffusion sheet 40 as described above, and a second surface 120, which is on the opposite side of the first surface 110, faces the display panel 20.

The plurality of grooves 160 may have the form of recesses sunken from the first surface 110 toward the center of the first transparent layer 130, and may be formed to extend along the first surface 110 in the direction of length of the first transparent layer 130.

Each of the plurality of grooves 160 may be formed by a first incline 161 (i.e., a first planar surface) and a second incline 162 (i.e., a second planar surface), which extend from an end of the groove. The first and second inclines 161 and 162 may have the form of rectangles, as shown in FIG. 4 (although they appear a straight lines in FIG. 4, they are formed in rectangles as the groove 160 extends in the direction of length of the first transparent layer 130 as described above). The first and second inclines 161 and 162 may instead have a curved form in another embodiment (in which case, they may appear as curved lines in a cross-sectional view as in FIG. 4).

The plurality of grooves 160 may be formed to have larger cross-sections in the direction of length of the optical sheet 100 from the end of the groove 163 to the first surface 110. In other words, in FIG. 4, the first and second inclines 161 and 162 may extend from the end 163 of the groove to be further away from each other as they approach the first surface 110. That is, a distance between the first and second inclines may be greater at the first surface 110 than at a location away from the first surface 110 such as the end of the groove 163.

The first surface 110 may include transmission portions 111 arranged between the plurality of grooves 160. The transmission portion 111 is an area in which light is incident on the optical sheet 100, which will be described later.

The second transparent layer 140 may have a second refractive index, which is different from the first refractive index, and may be arranged inside the plurality of grooves 160. Specifically, the second transparent layer 140 may be layered in the plurality of grooves 160 toward the first surface 110 to cover the first and second inclines 161 and 162. The second transparent layer 140 may fill a portion of the plurality of grooves 160.

For example, the second transparent layer 140 may be layered toward the first surface 110 to cover about 90% or more of the area of the first and second inclines 161 and 162. As will be described later, the first and second inclines 161 and 162 are areas in which the light passing the optical sheet 160 is totally reflected, and the second transparent layer 140 may be configured to cover about 90% or more of the area of the first and second inclines 161 and 162 in order for the light that passes the optical sheet 160 to be totally reflected.

The reflective layer 150 may include a reflective material to reflect light. The reflective material may include a resin that contains reflective color pigments or a metal substance.

The reflective layer 150 may be formed to cover all the plurality of grooves 160. Specifically, the second transparent layer 140 and the reflective layer 150 may be sequentially layered toward the first surface 110 in the plurality of grooves 160. The reflective layer 150 may have a form that covers all the plurality of grooves 160, such that the second transparent layer 140 is not exposed from the first surface 110. In other words, the reflective layer 150 may be formed in the plurality of grooves 160 in the form of filling the remainder of the inside of the plurality of grooves 160 that is not filled by the second transparent layer 140.

An end 151 of the reflective layer 150 may be aligned with the first surface 110 and the transmission portions 111. In other words, the first surface 110 may include both the transmission portions 111 and a rear surface of the reflective layer 150.

A process in which light output from the diffusion sheet 40 passes through the optical sheet 100 will now be described. For convenience of explanation, the following description will focus on a first groove 160a from among the plurality of grooves 160 and a second groove 160b from among the plurality of grooves 160 that is arranged to be adjacent to the first groove 160a.

Referring to FIGS. 5 and 6, light L1 output through an output plane of the diffusion sheet 40 may be output uniformly in all directions. The light L1 output from the diffusion sheet 40 may enter into the optical sheet 100 directly or via another component.

Some of the light L1 output from the diffusion sheet 40, which is denoted L2, may go into the optical sheet 100 directly through the transmission portions 111. Both the end 151 of the reflective layer 150 filling the plurality of grooves 160 and the transmission portions 111 are on the first surface 110. Some of the light L1 output from the diffusion sheet 40, which is light L2, may be output to the transmission portions 111 as shown in FIG. 5, and some other light L4 may be output to the end 151 of the reflective layer 150 as shown in FIG. 6. Among the light L1 output from the diffusion sheet 40, some light is output to a component other than the optical sheet 100. However, such light may go back to the diffusion sheet 40 through reflection and then may be output again, in which case it is assumed that the intensity is trivial.

Some of the light L2 output to the transmission portions 111 may go into the first transparent layer 130 via the transmission portions 111 and penetrate the first transparent layer 130 to the second surface 120, and may then be output to the display panel 20. The light output directly through the second surface 120 may be output to the display panel 20 at a right angle or almost a right angle with respect to the second surface 120.

Some of the light L2 incident upon the transmission portions 111 passes through the transmission portions 111 at a right angle or almost a right angle with respect to the first surface 110, and remains at the same right angle when passing through the second surface 120.

Some other of the light L2 output to the transmission portions 111 may pass through the transmission portions 111 at a slanted angle with respect to the first surface 110. In this case, the light that passes through the transmission portions 111 at the slanted angle with respect to the first surface 110 may be reflected by the first incline 161a of the first groove 160a or the first incline 161b of the second groove 160b inside the first transparent layer 130, and may thus pass through the second surface 120 at almost a right angle to the second surface 120.

As described above, the first transparent layer 130 has the first refractive index and the second transparent layer 140 has the second refractive index, which is different from the first refractive index, in which case the first refractive index may be higher than the second refractive index.

Since the first refractive index is higher than the second refractive index, the light L2 that enters the first transparent layer 130 through the transmission portion 111 may be totally reflected on the first incline 161a, which corresponds to a border plane between the first transparent layer 130 with the first refractive index and the second transparent layer 140 with the second refractive index, when the light L2 is incident on the first incline 161a at greater than a certain angle with respect to a surface normal of the first incline 161a.

In other words, some of the light L2 output to the transmission portion 111, which enters the first transparent layer 130 at a slanted angle with respect to the first surface 110 may be totally reflected on the first incline 161a and may pass through the second surface 120. In this case, the light may pass through the second surface 120 at a right angle or almost a right angle with respect to the second surface 120 due to the incidence angle to the first incline 161a. A detailed process of total reflection of the light L2 passing through the transmission portion 111 will be described later.

The light L2 passing through the transmission portion 111 may pass through the second surface 120 at a right angle or almost a right angle with respect to the second surface 120, which is denoted L3, and may then enter the display panel 20.

Specifically, the light L3 that passes through the second surface 120 via the transmission portion 111 may be incident on the display panel 20 at a right angle to the display panel 20, thereby preventing degradation of performance of the display panel 20.

The light L4 incident upon the end 151 of the reflective layer 150 may not pass through the reflective layer 150 but may be reflected back toward the diffusion sheet 40 due to the reflective substance of the reflective layer 150. The reflected light L4 may reenter the diffusion sheet 40, and may then be re-output toward the optical sheet 100 through the output plane of the diffusion sheet 40. Furthermore, in addition to the reflected light L4 from the reflective layer 150, reflected light from a component other than the reflective layer 150 may also reenter the diffusion sheet 40, and may then be re-output toward the optical sheet 100 through the output plane of the diffusion sheet 40.

Light L5 that is re-output by the diffusion sheet 40 may enter the transmission portion 111 and pass through the optical sheet 100, and accordingly light L6 that passes through the second surface 120 may enter the display panel 20 at a right angle to the second surface 120.

For example, light that is incident on the first surface 110 at more than a certain angle to the first surface 110 may not enter the transmission portion 111 but may instead be reflected by the reflective layer 150 and prevented from going into the optical sheet 100. This configuration is to prevent light incident on the optical sheet 100 at more than a certain angle from entering the display panel 20 at a slanted angle by preventing the light from passing directly through the optical sheet 100 at a slanted angle to the second surface 120 without being incident on the first incline 161a and 161b.

There is some concern of low optical efficiency because even light that is incident upon the reflective layer 150 at a right angle or almost a right angle is not transmitted but is instead reflected by the reflective layer 150. However, in this case, the light may re-enter the diffusion sheet 40 and then enter the transmission portion 111, which is denoted L5, so the loss of light may be reduced.

The optical sheet 100 may control directivity of the light L3 and L6 that passes through the second surface 120 to be orthogonal to the second surface 120 by using the reflective layer 150. This configuration allows only the light entering the optical sheet 100 at a certain incidence angle to pass through the optical sheet 100.

A detailed process of total reflection of light incident on the optical sheet 100 will now be described.

Referring to FIG. 7, some of the light L2 that enters the optical sheet 100 through the transmission portion 111 may be totally reflected on the first incline 161a, and may turn toward the second surface 120 and pass through the second surface 120. The light L2 passing through the transmission portion 111 may pass through the second surface 120 at a right angle or almost a right angle as it is totally reflected on the first incline 161a, and accordingly, the light L3 exiting the optical sheet 100 may enter the display panel 20 at a right angle or almost a right angle.

In this regard, for the light L2 that is incident on the first incline 161a to be totally reflected, the light L2 needs to be incident on the first incline 161a at a threshold angle θ or more that allows total reflection of the light L2 on the first incline 161a.

The threshold angle θ may be changed based on the first and second refraction indexes, and variously set depending on the material included in the first and second transparent layers 130 and 140. Once the threshold θ is set based on the first and second refraction indexes, width d1 of the transmission portion 111 (i.e., a predetermined distance between adjacent grooves) and length d2 of the first incline 161a may be determined such that the light L2 may be incident on the transmission portion 111 at the threshold angle θ or more.

In other words, the width d1 of the transmission portion 111 and the length d2 of the first incline 161a may be adjusted such that some of the light L2 incident on the transmission portion 111, which is incident on the first incline 161a, may be totally reflected.

Once the width d1 of the transmission portion 111 and the length d2 of the first incline 161a are determined based on the set threshold angle θ, the height h of the first groove 160a (i.e., a predetermined distance between an end 163a of the groove and the first surface 110) and the length w of the opening of the first groove 160 are determined, and thus the size of the plurality of grooves 160 on the whole and pitches of the plurality of grooves 160 may be determined.

In this way, the threshold angle θ is adjusted by adjusting the first and second refraction indexes, and the resultant width d1 of the transmission portion 111 and length d2 of the first incline 161a are determined, so that all the light L2 passing through the transmission portion 111 passes through the second surface 120 at a right angle or almost a right angle. Accordingly, the optical sheet 100 may easily adjust the directivity of light.

An optical sheet 100' of the display device 1 according to another embodiment will now be described. Overlapping features with those of the display device 1 in accordance with the previous embodiment will not be repeated in the following description.

Figure 8:
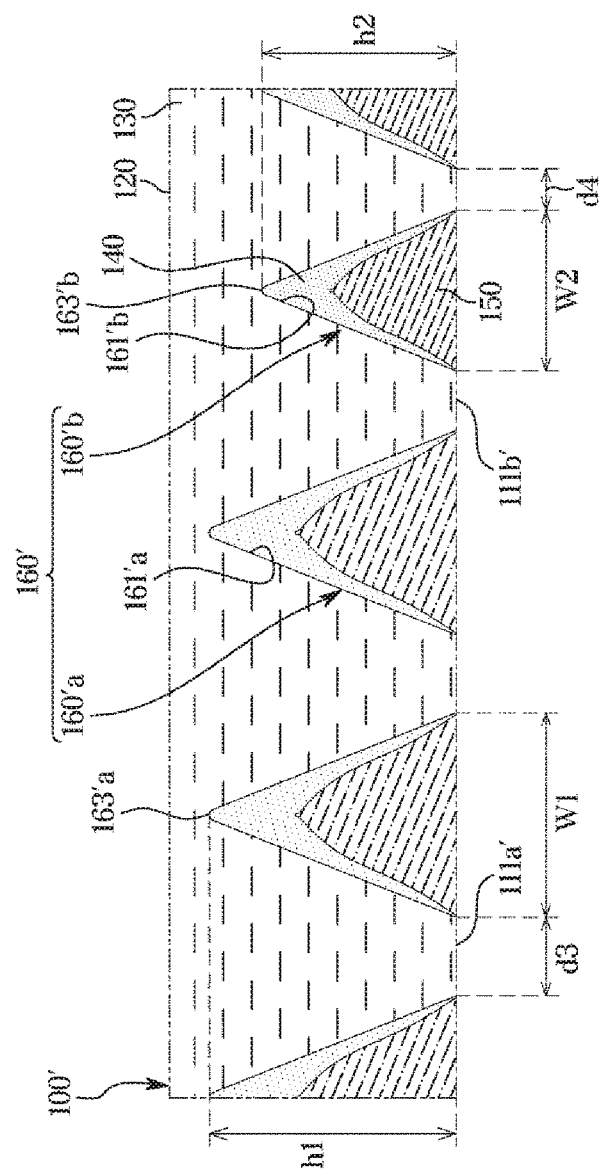
FIG. 8 is a cross-sectional view of an optical sheet of a display device, according to an embodiment.

FIG. 8 is a cross-sectional view of an optical sheet of a display device, according to another embodiment.

A plurality of grooves 160' may include a first groove 160'a and a second groove 160'b formed in different sizes. It is noted that the plurality of grooves 160' in the embodiment are formed in different sizes while the plurality of grooves 160 in the previous embodiment are all formed in the same size.

Referring to FIG. 8, the first groove 160'a may be formed in a different size from the second groove 160'b. Specifically, height (i.e., depth) h1 of the first groove 160'a (i.e., a distance between an end 163'a of the first groove 160'a and the first surface 110) may be greater than height (i.e., depth) h2 of the second groove 160'b (i.e., a distance between an end 163'b of the second groove 160' b and the first surface 110), and width w1 of the first groove 160'a may be greater than width w2 of the second groove 160'b.

More than one of each of the first groove 160'a and the second groove 160'b may be provided. Width d3 of a first transmission portion 111'a formed between the first grooves 160'a may be greater than width d4 of a second transmission portion 111'b formed between the second grooves 160'b.

As the first and second grooves 160'a and 160'b are formed in different sizes, ranges of total reflection of light on the incline 161'a of the first groove 160'a and the incline 161'b of the second groove 160'b may be different. Specifically, as the first groove 160'a is formed to be larger, a range of total reflection of light on the first groove 160'a may become wider, and accordingly, the range of incidence angle of light to be incident on the first surface 110 may be designed to be wider, so that the width d3 of the first transmission portion 111'a formed between the plurality of first grooves 160'a may be greater than the width d4 of the second transmission portion 111'b formed between the second grooves 160'b.

As the widths of the first and second transmission portions 111'a and 111'b are set differently, an amount of light to be incident on each of the transmission portions may be different. Therefore, an amount of light exiting the optical sheet 100' by way of the first and second transmission portions 111'a and 111'b may be different. Hence, in case that light is not uniformly incident on the entire first surface 110 of the optical sheet 100', the non-uniform light incidence may be corrected by arrangement of the first and second grooves 160'a and 160'b in the optical sheet 100'.

A diffusion sheet 200 of the display device 1 according to another embodiment will now be described. Overlapping features with those of the display device 1 in accordance with the previous embodiment will not be repeated in the following description.

Figure 9:
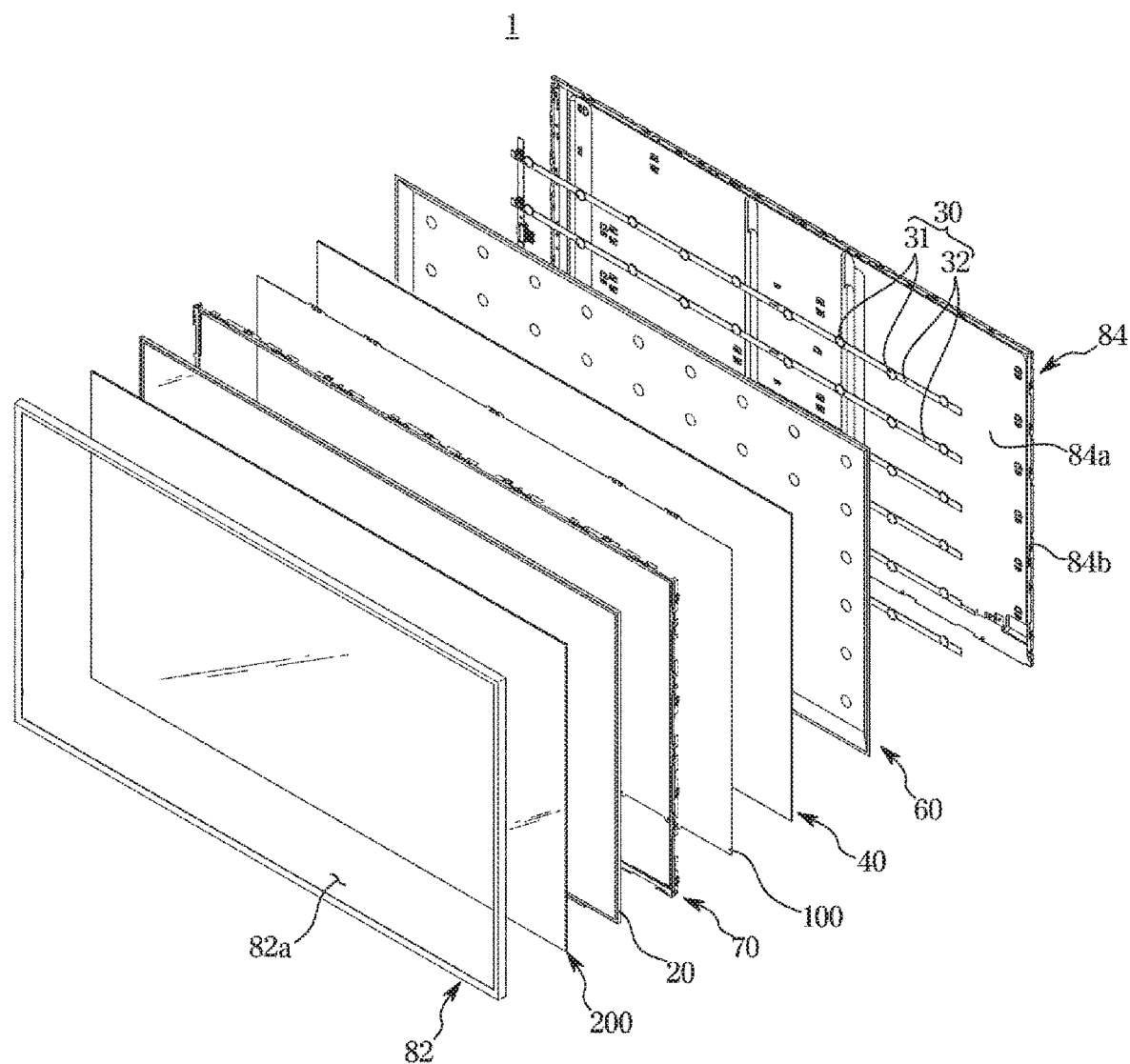
FIG. 9 is a cross-sectional view of part of a display device, according to an embodiment.

FIG. 9 is a cross-sectional view of part of a display device, according to another embodiment.

As described above, the display device 1 according to an embodiment may include the optical sheet 100 or 100' that may intensely output light with orthogonal directivity to the display panel 20.

Hence, an image is displayed on the display panel 20 based on light directed forward, so that high luminosity may be attained with a small amount of light. Furthermore, due to the directivity of the light, an image may be rendered in the display panel 20 to be visible to the user from the front but not visible from a side, so that the display device 1 may perform a special function (e.g., a so-called 'private function', by which images displayed on the display device 1 may not be visible to another person positioned next to the user who uses the display device 1).

In addition to the aforementioned effect, the optical sheet 100 may have enhanced color reproducibility of the display panel 20 as light output from the diffusion sheet 40 is incident on the display panel 20 at a right angle.

However, when there is no need for the 'private function', the viewing angle of the display device 1 may be unnecessarily narrowed. In this case, the display device 1 according to an embodiment may further include the diffusion sheet 200 arranged in front of the display panel 20, as shown in FIG. 9, to widen the viewing angle of the display device 1 while having high optical efficiency and color reproducibility without performing the 'private' function. In other words, the light output by the display device 1 shown in FIG. 9 may have enhanced optical efficiency and color reproducibility without implementing the 'private' function.

The diffusion sheet 200 may refract light that is output forward from the display panel 20, or output the light in all directions through total reflection as in the optical sheet 100. Accordingly, the display device 1 in this embodiment may secure a wide viewing angle while having high optical efficiency and color reproducibility.

A display device 1' according to another embodiment will now be described. It is noted that an optical sheet 300 as will be described below has the same configurations as the aforementioned optical sheet 100, and the same configurations and features of the display device 1' as those of the display device 1 will not be repeated.

Figure 10:
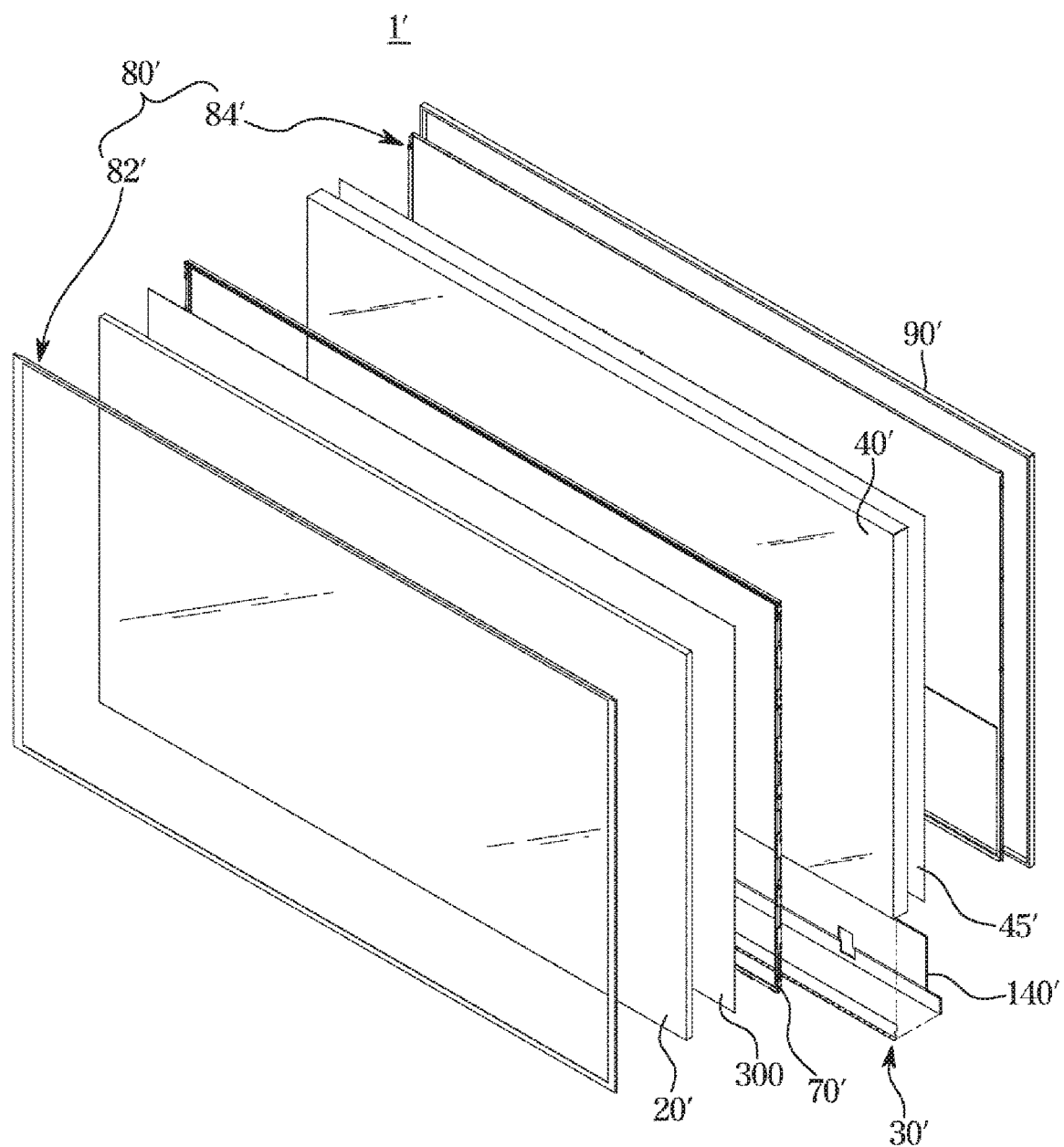
FIG. 10 is an exploded perspective view of a display device, according to an embodiment.
Figure 11:
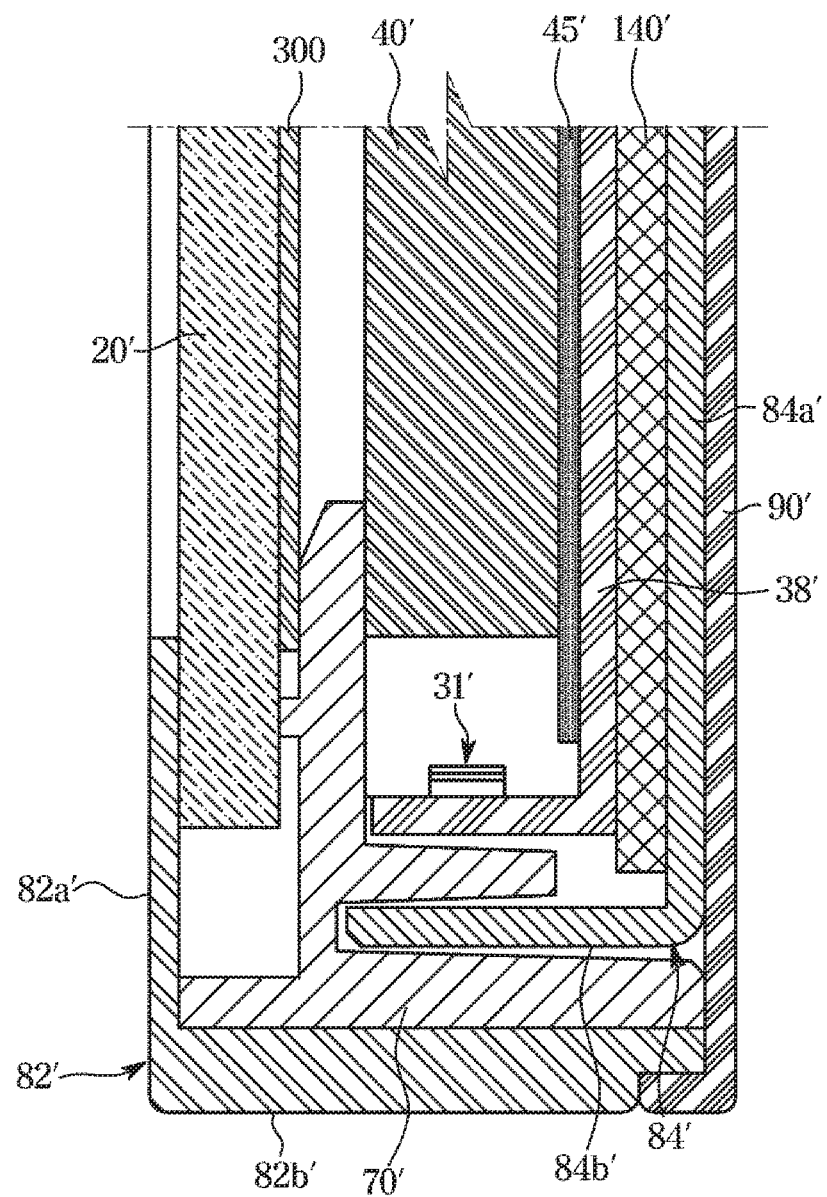
FIG. 11 is a cross-sectional view of part of a display device, according to an embodiment.
Figure 12:
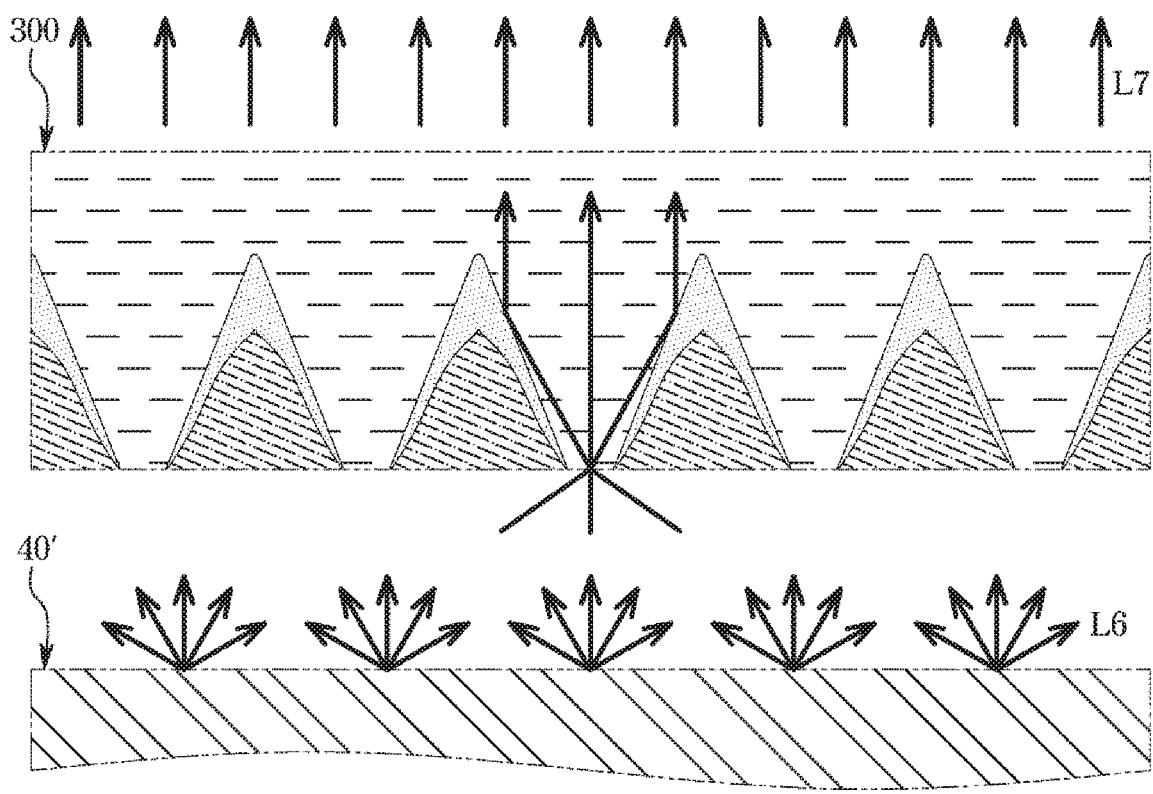
FIG. 12 schematically shows a state in which an optical sheet of a display device transmits light, according to an embodiment.

FIG. 10 is an exploded perspective view of a display device according to another embodiment, FIG. 11 is a cross-sectional view of part of a display device according to another embodiment, and FIG. 12 schematically shows a state in which an optical sheet of a display device transmits light according to another embodiment.

Unlike what is described above, the optical sheet 300 according to another embodiment may be applied not only to the direct type display device 1 but also to an edge type display device 1'.

The display device 1' may include a display panel 20' on which an image is displayed, a light source module 30' arranged behind the display panel 20', a light guide plate 40' arranged in the space between the display panel 20' and the light source module 30' for the light transmitted from behind to be diffused and transmitted to the display panel 20' in front, the optical sheet 300 arranged between the light guide plate 40' and the display panel 20', a middle mold 70' supporting the display panel 20' and the light guide plate 40', and a display chassis 80' forming the exterior of the display device 1'. The display chassis 80' may include a front chassis 82' coupled to the front of the middle mold 70' to keep the display panel 20' in the state of being installed in the middle mold 70', and a rear chassis 84' coupled to the back of the middle mold 70' and having the light source module 30' arranged on both inner sides.

The light source module 30' may be arranged inside the rear chassis 84' to radiate light toward the inner center of the rear chassis 84'. Although the light source module 30' is arranged in a bottom portion of the display panel 20' in this embodiment, the disclosure is not limited thereto, and the light source module 30' may be arranged on at least one of the bottom, the side, or the top of the display panel 20', or arranged along the edges of the display panel 20'.

The light guide plate 40', the display panel 20', and the front chassis 82' are sequentially arranged before the middle mold 70', and the rear chassis 84' is arranged behind the middle mold 70'. With this configuration, the middle mold 70' may support the respective components as well as keep the display panel 20' and the rear chassis 84 separated.

The front chassis 82' may include a bezel part 82a' covering the front edge of the display panel 20', and a side part 82b' bending backward from an end of the bezel part 82a' and covering the side of the middle mold 70'.

The rear chassis 84' may include a rear part 84a' forming the rear side of the display device 1, and a side part 84b' extending forward from an end of the rear part 84a' to be coupled into the middle mold 70'.

The light source module 30' may include a light source package 31' and a PCB 38'.

The light source package 31' includes LEDs as light sources. There may be a plurality of light source packages 31', which may be arranged at regular intervals. The plurality of light source packages 31' may be arranged to be separated from each other on the PCB 38'.

The light guide plate 40' is arranged to be apart from the rear chassis 84', and the light source module 30' is arranged on both sides in the space between the inner sides of the light guide plate 40' and rear chassis 84', i.e., on the side part 84b'.

The light guide plate 40' may include a reflective member 45' on the rear side. The reflective member 45' may be arranged on the rear of the light guide plate 40' for the light provided from the light source package 31' to be directed entirely to the front. The reflective member 45' is a reflective plate, which may be configured separately from the light guide plate 40' and arranged on the rear of the light guide plate 40', or may be integrated with the light guide plate 40'. Furthermore, the same effect may be obtained by reflective coating of the rear face of the light guide plate 40'.

The light guide plate 40' is provided to be transparent to light provided from the light source. For this, the light guide plate 40' may be formed of a transparent resin. To minimize deformation from heat generated from the light source, the light guide plate 40' may be arranged a certain distance away from the light source.

A back cover 90' may be arranged behind the rear chassis 84' to cover the back of the rear chassis 84' and form the exterior of the display device 1'.

Before entering to the display panel 20', the light output from the light guide plate 40' passes the optical sheet 300 to be incident on the display panel 20' at a right angle while being focused onto the center of the display panel 20'.

Specifically, unlike the display device 1 in the previous embodiment, where the light output from the diffusion sheet 40 is incident on the optical sheet 100, the display device 1' according to this embodiment may include the light guide plate 40' for the light output from the light guide plate 40' to enter into the optical sheet 300 to output light L7 to enter to the display panel 20' at a right angle.

A diffusion sheet 400 of the display device 1' according to another embodiment will now be described. Configurations other than the diffusion sheet 400 are the same as what are described above in connection with the display device 1', so the overlapping description thereof will not be repeated.

Figure 13:
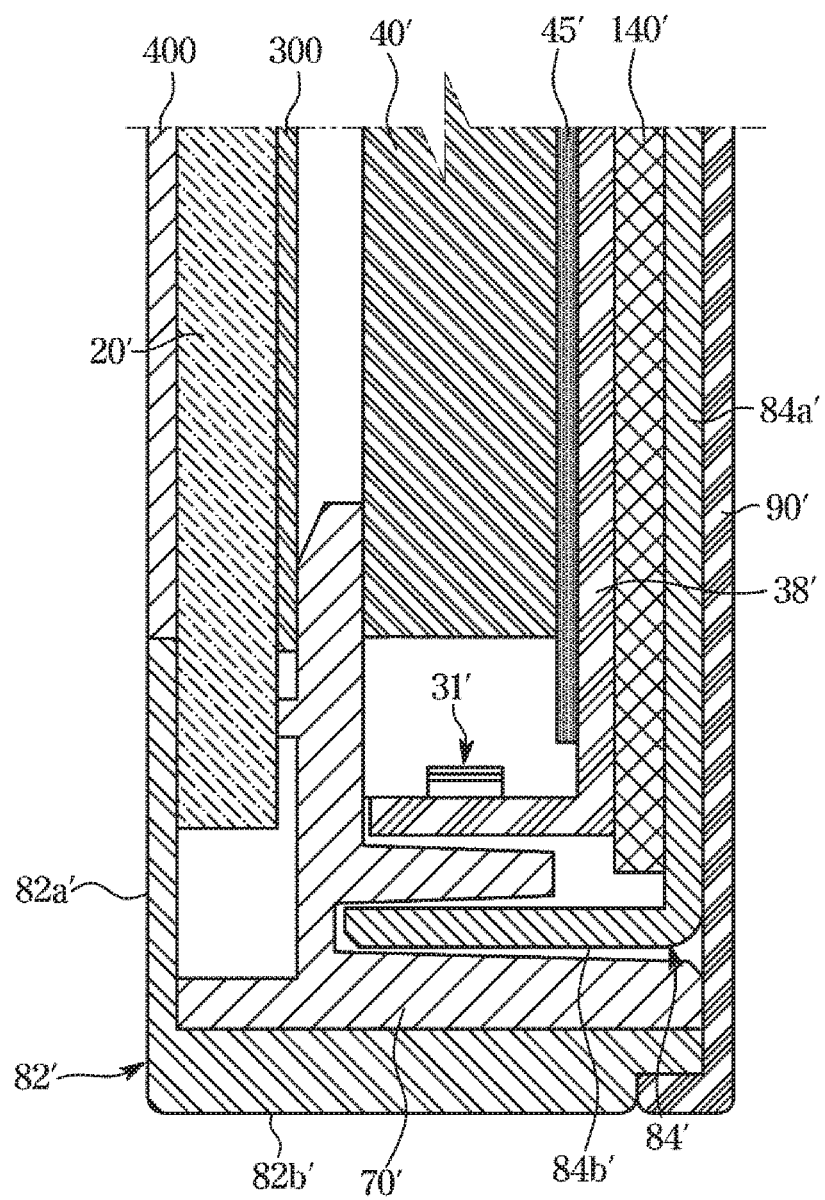
FIG. 13 is a cross-sectional view of part of a display device, according to an embodiment.

FIG. 13 is a cross-sectional view of part of a display device, according to another embodiment.

The display device 1' may further include the diffusion sheet 400 arranged in front of the display panel 20' as shown in FIG. 13 so as to widen the viewing angle for a displayed image.

The diffusion sheet 400 may refract light that is output forward from the display panel 20', or may output the light in all directions through total reflection as in the optical sheet 300. Accordingly, the display device 1 in this embodiment may secure a wide viewing angle while having high optical efficiency and color reproducibility.

According to embodiments, a display device may control directivity of light radiated from a backlight unit (BLU) such that most of the light is directed forward, thereby minimizing the light directed sideways to increase optical efficiency.

Furthermore, an optical sheet may guide light directed to the display panel to be incident substantially orthogonally on the display panel, thereby increasing efficiency of the display panel.

Several embodiments have been described above, but a person of ordinary skill in the art will understand and appreciate that various modifications can be made without departing from the scope of the present disclosure. Thus, it will be apparent to those ordinary skilled in the art that the scope of technical protection is defined by the following claims.

What is claimed is:

1. A display device comprising:
   a display panel configured to display an image;
   a light source module comprising a plurality of light sources; and
   an optical sheet provided between the display panel and the light source module, the optical sheet being configured to guide light radiated by the light source module to the display panel,
   wherein the optical sheet comprises:
      a first transparent layer comprising a plurality of grooves provided on a first surface of the optical sheet that is opposite to a second surface of the optical sheet facing the display panel, the first transparent layer having a first refraction index,
      a second transparent layer provided in each groove of the plurality of grooves, the second transparent layer having a second refraction index that is different from the first refraction index, and
      a reflective layer provided in each groove of the plurality of grooves and covering the second transparent layer, the reflective layer comprising a light-reflective material.

2. The display device of claim 1, wherein the first refraction index is greater than the second refraction index.

3. The display device of claim 1, wherein the first surface further comprises a plurality of transmission portions provided between the plurality of grooves, the plurality of transmission portions being configured to transmit incident light exiting the light source module.

4. The display device of claim 1, wherein the first surface of the first transparent layer is configured to prevent light from being refracted while passing through the second surface of the first transparent layer.

5. The display device of claim 3, wherein the plurality of grooves comprises a first groove including a first incline and a second incline,
wherein the plurality of transmission portions comprises a first transmission portion adjacent to the first incline, and
wherein light transmitted by the first transmission portion and incident upon the first incline is totally reflected by the first incline.

6. The display device of claim 5, wherein the optical sheet is further configured guide the light radiated by the light source module such that light totally reflected by the first incline is incident upon the second surface at a right angle to the second surface.

7. The display device of claim 5, wherein the second transparent layer covers 90% or more of surfaces of the first incline and the second incline.

8. The display device of claim 7, wherein the reflective layer is covers the second transparent layer such that the second transparent layer is not exposed on an external surface of the optical sheet.

9. The display device of claim 8, wherein the first surface comprises surfaces of the plurality of transmission portions.

10. The display device of claim 5, wherein a distance between the first incline and the second incline is greater at the first surface than at a location away from the first surface.

11. The display device of claim 10, wherein each of the first incline and the second incline has a rectangular form.

12. The display device of claim 10, wherein each of the first incline and the second incline has a form of a curved plane.

13. The display device of claim 5, wherein the plurality of grooves comprises a second groove having a size that is different from a size of the first groove.

14. The display device of claim 13, wherein the second groove has a shape that is different from a shape of the first groove.

15. The display device of claim 1, further comprising a diffusion sheet provided between the light source module and the optical sheet, the diffusion sheet being configured to diffuse light exiting the light source module.

16. A display device comprising:
a display panel configured to display an image in a first direction;
a light source module comprising a plurality of light sources;
a diffusion sheet configured to diffuse light radiated by the light source module in the first direction; and
an optical sheet provided between the display panel and the diffusion sheet, the optical sheet being configured to guide light diffused by the diffusion sheet to the display panel,
wherein the optical sheet comprises:
a first transparent layer comprising a plurality of grooves provided on a first surface of the optical sheet that is opposite to a second surface of the optical sheet facing the diffusion sheet,
a second transparent layer provided in each groove of the plurality of grooves, and
a reflective layer arranged in each groove of the plurality of grooves and covering the second transparent layer, the reflective layer comprising a light-reflective material.

17. The display device of claim 16, wherein a first refraction index of the first transparent layer is higher than a second refraction index of the second transparent layer.

18. The display device of claim 17, wherein the first surface further comprises a plurality of transmission portions provided between the plurality of grooves, the plurality of transmission portions being configured to transmit incident light exiting the diffusion sheet.

19. The display device of claim 18, wherein the plurality of grooves comprises a first groove including a first incline and a second incline,
wherein the plurality of transmission portions comprises a first transmission portion adjacent to the first incline, and
wherein light transmitted by the first transmission portion and incident upon the first incline is totally reflected by the first incline.

20. A display device comprising:
a display panel configured to display an image;
a light source module comprising a plurality of light sources;
a diffusion sheet configured to diffuse light radiated by the light source module to the display panel; and
an optical sheet provided between the display panel and the diffusion sheet,
wherein the optical sheet comprises a first transparent layer having a first refraction index and a second transparent layer having a second refraction index that is different from the first refraction index, and
wherein light entering the optical sheet through the first transparent layer is totally reflected at a border between the first transparent layer and a second transparent layer and is transmitted by the optical sheet.

* * * * *